(12) United States Patent  
Holbrook

(10) Patent No.: US 7,841,270 B2
(45) Date of Patent: Nov. 30, 2010

(54) FLIP-OVER ACCESSORY FOR BARBECUE GRILL

(76) Inventor: Paul Robert Holbrook, 2218 Miramar La., Buffalo Grove, IL (US) 60089

( * ) Notice: Subject to any disclaimer, the term of this patent is extended or adjusted under 35 U.S.C. 154(b) by 1262 days.

(21) Appl. No.: 11/405,131

(22) Filed: Apr. 17, 2006

(65) Prior Publication Data

US 2007/0240698 A1    Oct. 18, 2007

(51) Int. Cl.
*A47J 37/04* (2006.01)
(52) U.S. Cl. .......................... 99/395; 99/397
(58) Field of Classification Search ............... 99/395, 99/421 H, 421 HH, 421 R, 644, 327, 328, 99/329 R, 329 RT, 334, 335, 340, 449, 450, 99/397, 398, 424, 427; 126/25 R, 27, 29, 126/30; *A47J 37/00*
See application file for complete search history.

(56) References Cited

U.S. PATENT DOCUMENTS

| | | | | |
|---|---|---|---|---|
| 2,983,218 A * | 5/1961 | Persinger et al. | ............... | 99/427 |
| 4,442,762 A * | 4/1984 | Beller | ........................ | 99/427 |
| 4,492,152 A * | 1/1985 | DeSantis | ...................... | 99/397 |
| 4,562,771 A * | 1/1986 | Williams | ...................... | 99/397 |
| 4,924,766 A * | 5/1990 | Hitch | ..................... | 99/421 HV |
| 4,968,515 A * | 11/1990 | Burkett et al. | ............... | 426/233 |
| 5,224,676 A * | 7/1993 | Johnston | ............... | 248/231.85 |
| 5,410,948 A * | 5/1995 | Eickmeyer | .................... | 99/335 |
| 5,669,290 A * | 9/1997 | Natsumi et al. | ........... | 99/421 H |
| 5,782,224 A * | 7/1998 | Rabell | ....................... | 126/25 R |
| 2004/0031478 A1* | 2/2004 | Gifford | .................. | 126/25 AA |
| 2007/0137501 A1* | 6/2007 | Manuel | ...................... | 99/450 |

* cited by examiner

*Primary Examiner*—Geoffrey S Evans

(57) ABSTRACT

An accessory for a barbecue grill which automatically flips food over 180 degrees at desired intervals, and which allows the food to rest essentially on the existing grill rack surface when cooking. The system includes a food support rack, rack mounts, linkage, motor control and motor mount with a motor and an L-shaped drive shaft. The food support rack includes lower and upper racks of open mesh, with the food to be cooked placed therebetween. The rack mounts provide for rotatable movement of the food support rack and are located on an axis essentially coincident with one of the longitudinal edges of the food support rack. The linkage attaches the drive shaft to the food support rack. The linkage attaches the drive shaft to the food support rack and is adjustable to accommodate grills having a varying dimension from the grill rack surface to the top edge of the grill lateral wall.

10 Claims, 17 Drawing Sheets

| Step # | Button Press(es) | Display at Conclusion of Button Press(es) | Illuminated Buttons at Conclusion of Button Press(es) |
|---|---|---|---|
| 1 | Program | "P #?" (flashing) | All P #s (flashing) |
| 2 | P # (1 for example) | "P 1" (flashing) | P 1 (flashing) |
| 3 | T 1 | "0.0" (flashing) | P 1 and T 1 (both flashing) |
| 4 | Up (.5 minute increments) | "3.5" (for example) (flashing) | P 1 and T 1 (both flashing) |
| 5 | Enter | "3.5" | P 1 (flashing) and T 1 |
| 6 | T 2 | "0.0" (flashing) | P 1 and T 2 (both flashing) |
| 7 | Up (.5 minute increments) | "2.5" (for example) (flashing) | P 1 and T 2 (both flashing) |
| 8 | Enter | "2.5" | P 1 (flashing) and T 2 |
| 9 | Enter | "OK" (remains illuminated for 3 seconds, then display goes blank) | P1 (remains illuminated for 3 seconds, then goes blank) |

FIG. 12

| Step # | Button Press(es) | Display at Conclusion of Button Press(es) | Illuminated Buttons at Conclusion of Button Press(es) |
|---|---|---|---|
| 1 | Program | "P #?" (flashing) | All P #s (flashing) |
| 2 | P 1 | "P 1" (flashing) | P 1 (flashing) |
| 3 | T 1 | "'3.5" (flashing) | P 1 and T 1 (both flashing) |
| 4 | Down (once) | "3.0" (flashing) | P 1 and T 1 (both flashing) |
| 5 | Enter | "OK" (remains illuminated for 3 seconds, then display goes blank) | P1 (remains illuminated for 3 seconds, then goes blank) |

FIG. 13

FLIP-OVER ACCESSORY FOR BARBECUE GRILL

RELATED APPLICATIONS

None

FEDERALLY SPONSORED RESEARCH/DEVELOPMENT

None

MICROFICHE APPENDIX

None

BACKGROUND OF THE INVENTION

1. Field of the Invention

The present invention relates to an accessory for a barbecue grill which automatically flips food over at desired intervals, and which allows the food to rest essentially on the existing grill rack surface when cooking.

2. Prior Art

The use of grills with food turning racks is known in the prior art (reference U.S. Pat. No. 4,583,452 to Grosse disclosing a food holder for barbecue rotisserie). However, such devices turn the food constantly and have no ability to properly cook food intended to be cooked primarily on 2 sides only, for example hamburgers or steaks etc. To cook properly, such food requires presenting one side of the food to the heat source for a predetermined time, and then flipping the food 180 degrees for another predetermined time. Depending on the food, it is often desirable to flip the food twice or more in this fashion to achieve optimum cooking. There is some prior art which addresses solutions for automatically turning such 2-sided food (reference U.S. Pat. No. 4,562,771 to Williams disclosing a flip-over drive system for a removable oven rotisserie, and U.S. Pat. No. 5,410,948 to Eickmeyer disclosing a cooking grill with automatically rotatable food supporting faces), however they are not suitable for use with an existing grill rack because the food is not allowed to be located on the grill rack surface during cooking. This is because the pivot axis of the rotating food support rack on such devices is located essentially along a line connecting the center of the lateral edges of the food support rack. Thus, if such devices are used on a grill with an existing grill rack, then while cooking the food will be suspended a distance at least one half the length of the support rack lateral edge above the existing grill rack surface. Thus, the food will not cook properly if suspended at a height remote from the heat source. The user's only other option is to remove the existing grill rack each time the device is used, which is a difficult, dirty procedure.

BRIEF SUMMARY OF THE INVENTION

In view of the foregoing disadvantages inherent in the known types of food turning devices now present in the prior art, the present invention provides an accessory for a barbecue grill which automatically flips food over at desired intervals, and which allows the food support rack to rest essentially on the existing grill rack surface when cooking.

The system is comprised of a plurality of component elements. In their broadest context, such component elements include a support rack, rack mounts, linkage, motor control and motor mount with motor and drive shaft.

The support rack is comprised of a lower rack of an open mesh upon which the food to be cooked may be placed. Of a corresponding size and configuration is an upper rack of an open mesh which is adapted to be positioned over the food to be cooked. Releasable clamps function to couple together the lower rack and upper rack. When coupled together, the lower rack and upper rack support therebetween the food to be cooked.

The rack mounts are adapted to provide for rotatable movement of the rack, and are located on an axis essentially coincident with one of the longitudinal edges of the support rack. The rack mounts attach semi-permanently to the existing grill and are designed such that the user may easily remove the support rack from the rack mounts, which may be desirable in the event the user wishes to clean the support rack or use the entire grill rack surface for other purposes.

The linkage attaches the drive shaft to the support rack, and is designed to be adjustable such that the accessory will work properly with grills having varying dimension from grill rack surface to top edge of grill lateral wall.

The motor control activates the motor, causing the support rack to be flipped 180 degrees. In the preferred embodiment, the motor control includes a programmable control comprising a timer and timer control coupled to the motor such that the motor may be energized for a preselected time at preselected intervals to automatically flip the support rack 180 degrees. In the preferred embodiment, the programmable control is further designed whereby a beep tone is issued to alert the user that the food is finished cooking at the end of a programmed cycle. In the preferred embodiment, the programmable control is mounted inside the motor mount. In an alternate embodiment, the motor control may be a simple switch which may either be installed in the motor mount or remote from the motor mount using a cable. In another alternate embodiment, the motor control may be of radio frequency (RF) or infrared (IR) design, such that a user could use a remote control transmitter to send a signal to a receiver mounted in the motor mount to activate the motor. In yet another embodiment, the motor control may include both a programmable control and a remote to give users the option of using either approach.

The motor mount includes a motor and drive shaft such that activation of the motor causes the drive shaft to rotate and automatically flip the support rack 180 degrees. In the preferred embodiment, the motor mount further contains a power source to energize the motor. In the preferred embodiment, this power source is battery based. In an alternate embodiment, the power source is remote from the motor mount.

BRIEF DESCRIPTION OF THE DRAWINGS

The foregoing aspects and other features of the present invention are explained in the following description, taken in combination with the accompanying drawings, wherein:

FIG. 12 shows an example of how to program the programmable control pad.

FIG. 13 shows an example of how to change an existing program.

DETAILED DESCRIPTION OF THE INVENTION

Figure 1:
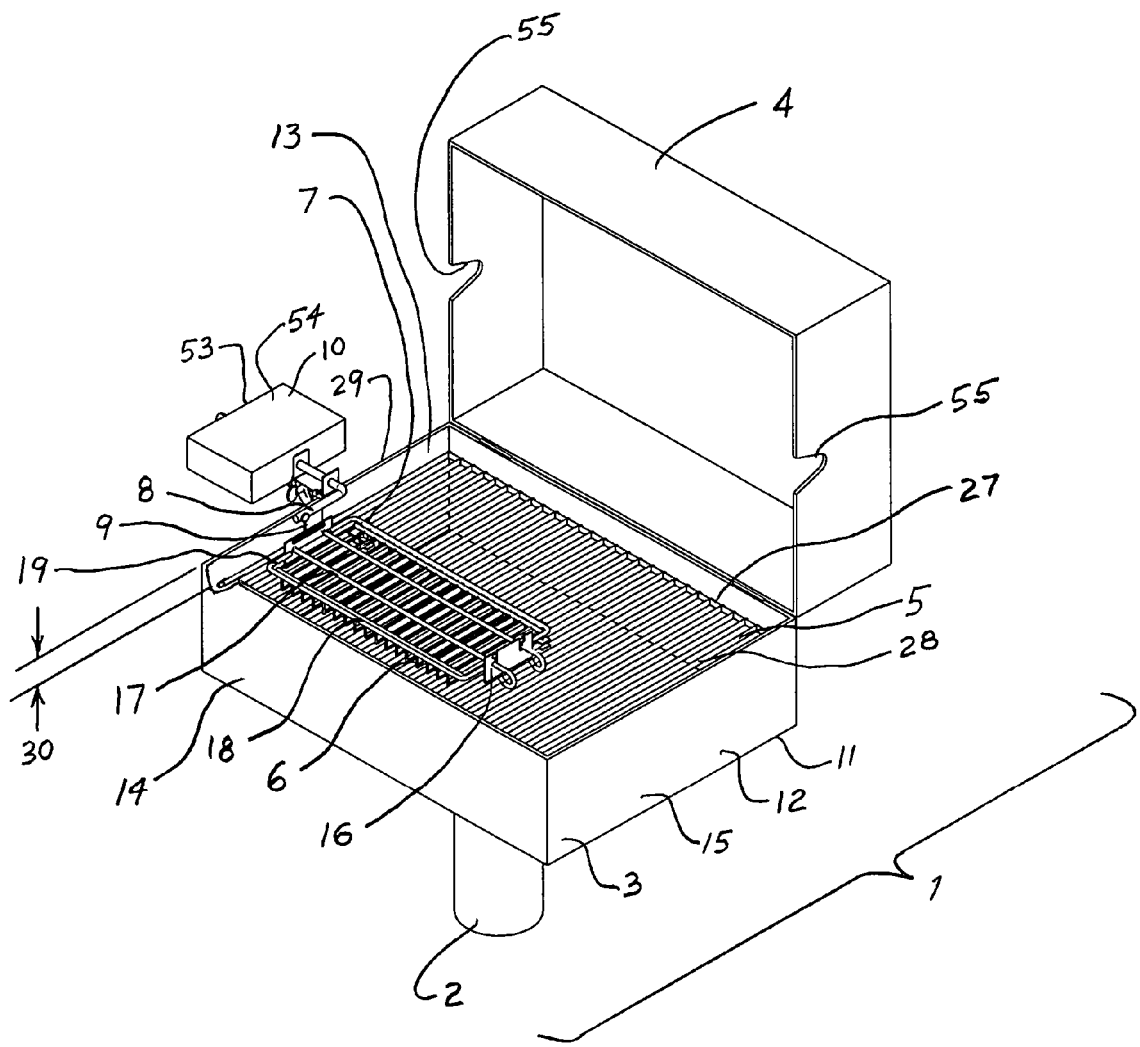
FIG. 1 is a perspective view of an existing grill with the flip-over accessory installed and the support rack in a first position.

Referring to FIG. 1 there is shown a perspective view of an existing grill with the flip-over accessory installed and the support rack in the front position. Grill 1 is comprised of base 2, support container 3, cover 4 and grill rack 5. Grill rack 5 has long longitudinal edges 27 and short lateral edges 28 therebetween. The support container 3 contains a heat source to cook the food. The support container 3 includes an essentially closed lower horizontal plate 11 and generally vertically disposed plates 12 extending upwardly from the periphery of the lower plate. It also includes an open upper edge 13 with peripheral walls. The walls include long longitudinal walls 14 and short lateral walls 15 therebetween.

Flip-over accessory is comprised of food support rack 6, rack mounts 7, linkage 9 and motor mount 10. Motor mount 10 consists of a heat resistant enclosure 53, within which is a motor (not shown) which when energized causes L-shaped drive shaft 8 to rotate 180 degrees, providing the force to flip the support rack at desired intervals. In the preferred embodiment, the motor is a DC electrical motor type and is powered by batteries also housed within the enclosure. In alternate embodiments, the motor is DC electrical and is powered by a transformer which is plugged into a household electrical outlet remote from the motor mount. In another alternate embodiment, the motor is AC electrical type and is plugged directly into a household electrical outlet remote from the motor mount.

In the preferred embodiment, the motor mount 10 houses a programmable control (not shown) comprised of a timer circuit (not shown) and timer control circuit (not shown) such as are commonly found in the art to allow the user to enter the desired cooking interval(s) before the food is flipped over and the cooking interval following the final flip, at which time a beep tone is issued to alert the user the food is finished. In the preferred embodiment, the timer is an integrated circuit (IC) type. In an alternate embodiment, the timer is mechanical in nature similar to an egg timer. Programmable control pad 54 is operatively coupled to the programmable control and allows the user to enter, store and change programmed data.

In the preferred embodiment, rack mounts 7 are attached to grill rack 5 and are designed such that the support rack may be quickly and easily released from the rack mounts. In the preferred embodiment, each rack mount 7 is attached to the grill rack 5 using a pair of mounting plates and a screw (see FIG. 4).

Support rack 6 is comprised of lower rack 16 of an open mesh upon which the food to be cooked may be placed. Of a corresponding size and configuration is an upper rack 17 of an open mesh which is adapted to be positioned over the food to be cooked. The lower and upper racks 16 and 17 have long longitudinal edges 18 and short lateral edges 19 therebetween. Linkage 9 connects drive shaft 8 to support rack 6.

Figure 4:
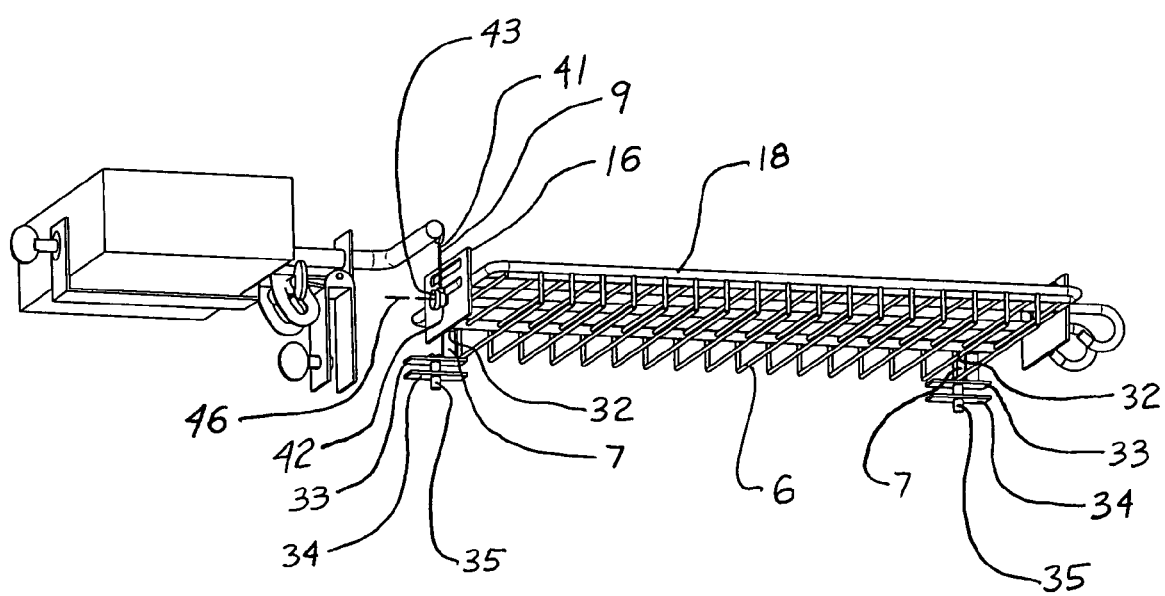
FIG. 4 shows a similar view to FIG. 3, except viewed from a front left perspective.

In the preferred embodiment, linkage 9 is flexible in nature and is similar to a metallic bead chain type (see FIG. 4). Because dimension 30 between grill rack surface 5 and top edge 29 of short lateral wall 15 is variable depending on the grill, the linkage 9 is of an adequate length to accommodate commonly available grills with the maximum dimension 30. For users with grills having a dimension less than this maximum, they would use only the length of the linkage they need to connect the drive shaft 8 to the support rack 6 and trim off the excess linkage length. Thus, the system will function properly on grills of varying dimension from grill rack surface to top edge 29 of short lateral wall 15.

Openings 55 are commonly provided on grills for the use of the more typical rotisserie attachments found in the prior art.

Figure 2:
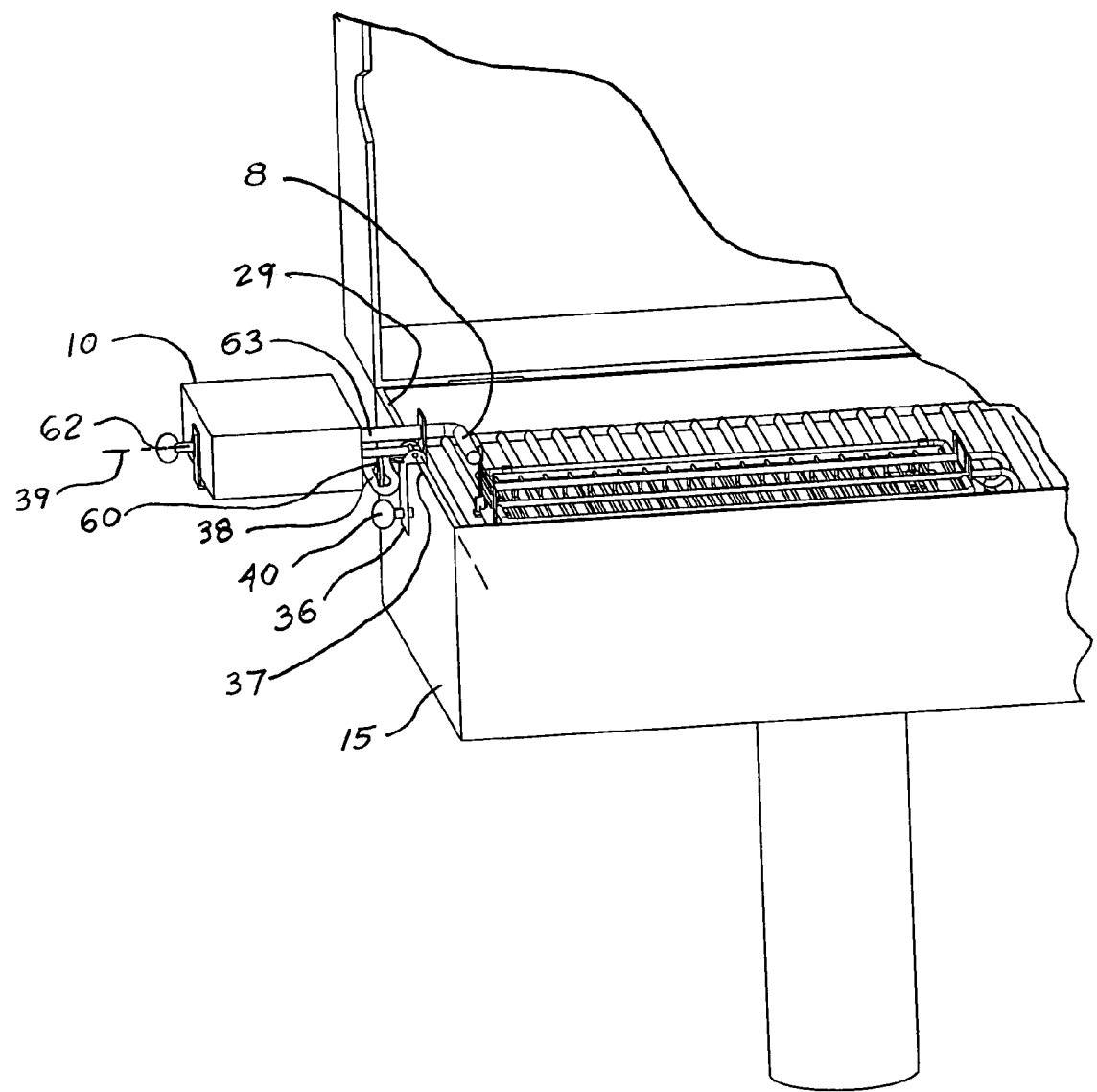
FIG. 2 is a close-up perspective viewed from the front left corner of the grill.

Referring now to FIG. 2, motor mount 10 is secured to short lateral wall 15 by grill bracket 36, and is positioned such that section 63 of drive shaft 8 will pass through opening 55 of grill cover 4 (see FIG. 1) when grill is closed for cooking. After grill bracket 36 is positioned properly, grill bracket thumbscrew 40 is tightened until secure. Grill bracket 36 pivots on motor mount bracket 38 about axis 37 to allow for mounting on grills with tapered lateral walls (see FIG. 15). After motor mount bracket 38 has been positioned properly, motor mount lateral axis thumbscrew 60 is tightened until secure. Axis 37 is thus essentially parallel to the top edge 29 of short lateral wall 15. In addition, motor mount 10 pivots on motor mount bracket 38 about axis 39 to allow for mounting on grills with a slope on the top of the lateral walls (see FIG. 17). After motor mount 10 has been positioned properly, motor mount longitudinal axis thumbscrew 62 is tightened until secure. Axis 39 is thus essentially coincident with the axis of rotation of section 63 of drive shaft 8.

Figure 3:
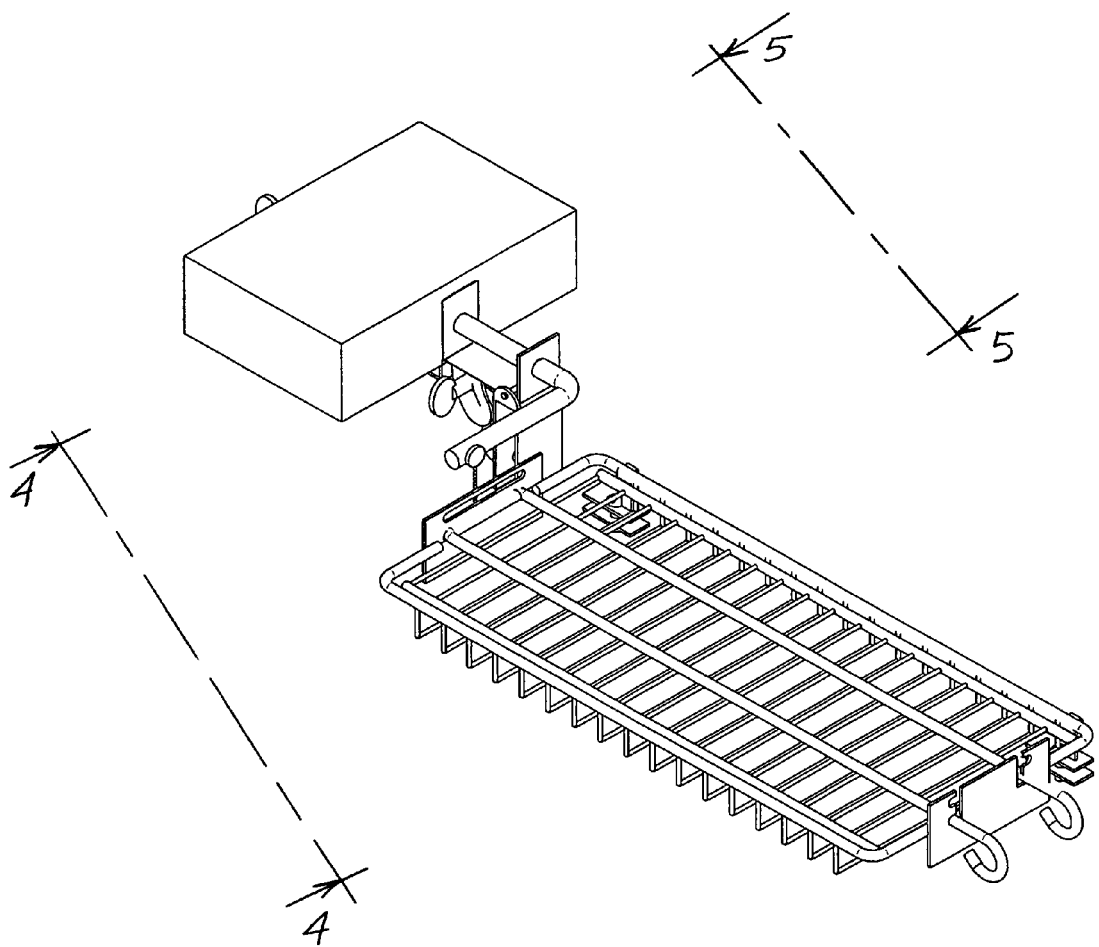
FIG. 3 shows a similar view to FIG. 1, except with the grill removed from the view for clarity.

Referring now to FIG. 3, the grill has been removed for clarity.

Referring now to FIG. 4, rack mounts 7 are comprised of pivot 32, mounting plates 33 and 34, and Screw 35. To install the rack mounts to the existing grill rack, the user positions the two mounting plates 33 and 34 on the existing grill rack bars and tightens the screw 35 until secure (see FIG. 6). Linkage 9 is comprised of metallic bead chain 41 and pivot clip 42. Pivot clip 42 rotates on post 43 of lower rack 16 about axis 46 and allows for free rotation of the support rack 6 when the support rack is flipped. Axis 46 is thus essentially parallel to longitudinal edges 18 of support rack 6. In the preferred embodiment, post 43 is part of lower rack 16.

Figure 5:
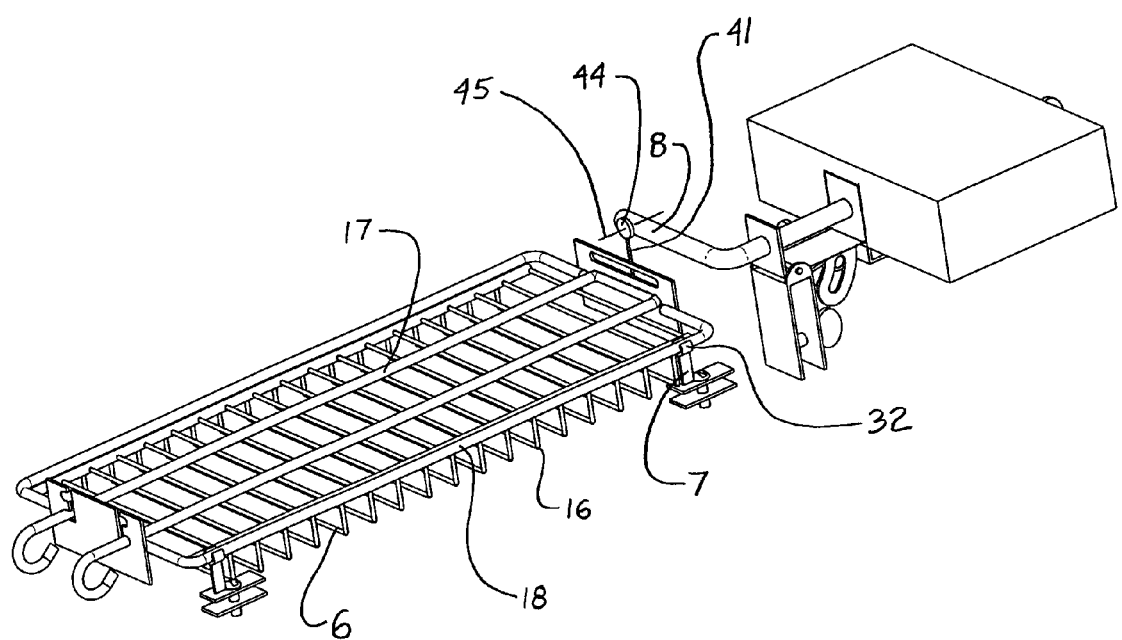
FIG. 5 shows a close-up perspective viewed from a rear right perspective.

Referring now to FIG. 5, rack mount pivot 32 is clearly seen engaging long longitudinal edge 18 of support rack 6, providing for pivoting motion of the support rack 6 about an axis coincident with the longitudinal edge 18. In the preferred embodiment, the rack mounts 7 engage the lower rack 16.

To remove the support rack 6 for example for cleaning, the user merely gives a firm pull in the upward direction and support rack pops out of the pivots 32. In addition, the user disconnects the support rack 6 from the linkage 9 by popping the pivot clip 42 off of post 43 (see FIG. 4). Metallic bead chain 41 is attached to drive shaft 8 at pivot 44, which also allows for free rotation about axis 45 when the support rack 6 is flipped. Axis 45 is thus essentially parallel to longitudinal edges 18 of support rack 6.

Figure 6:
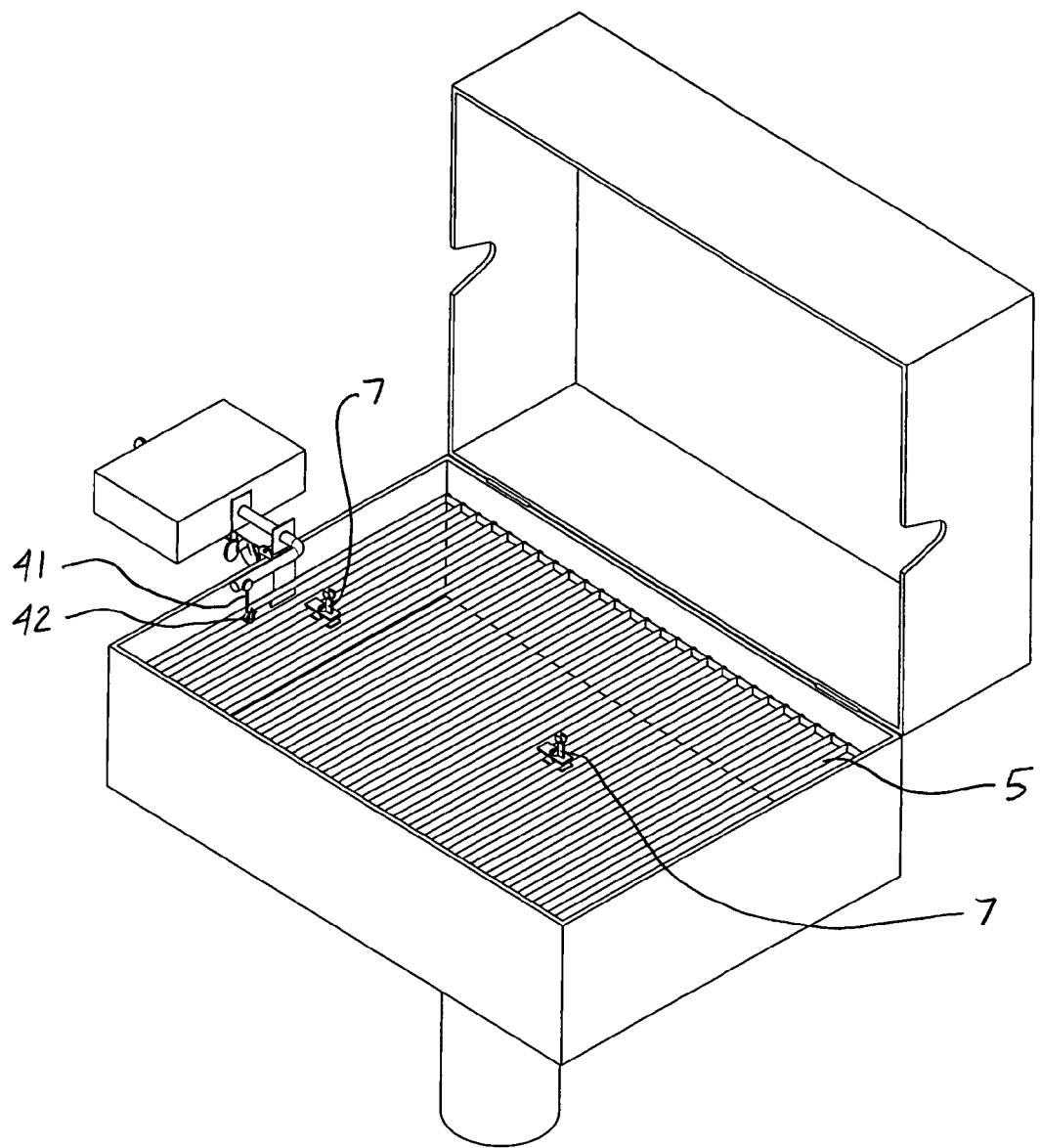
FIG. 6 shows a close-up perspective of the grill, except with the support rack removed from the view for clarity.

Referring now to FIG. 6, the support rack has been removed for clarity. Rack mounts 7 may be clearly seen installed on the grill rack 5, and pivot clip 42 of metallic bead chain 41 is also more clearly seen).

Figure 7:
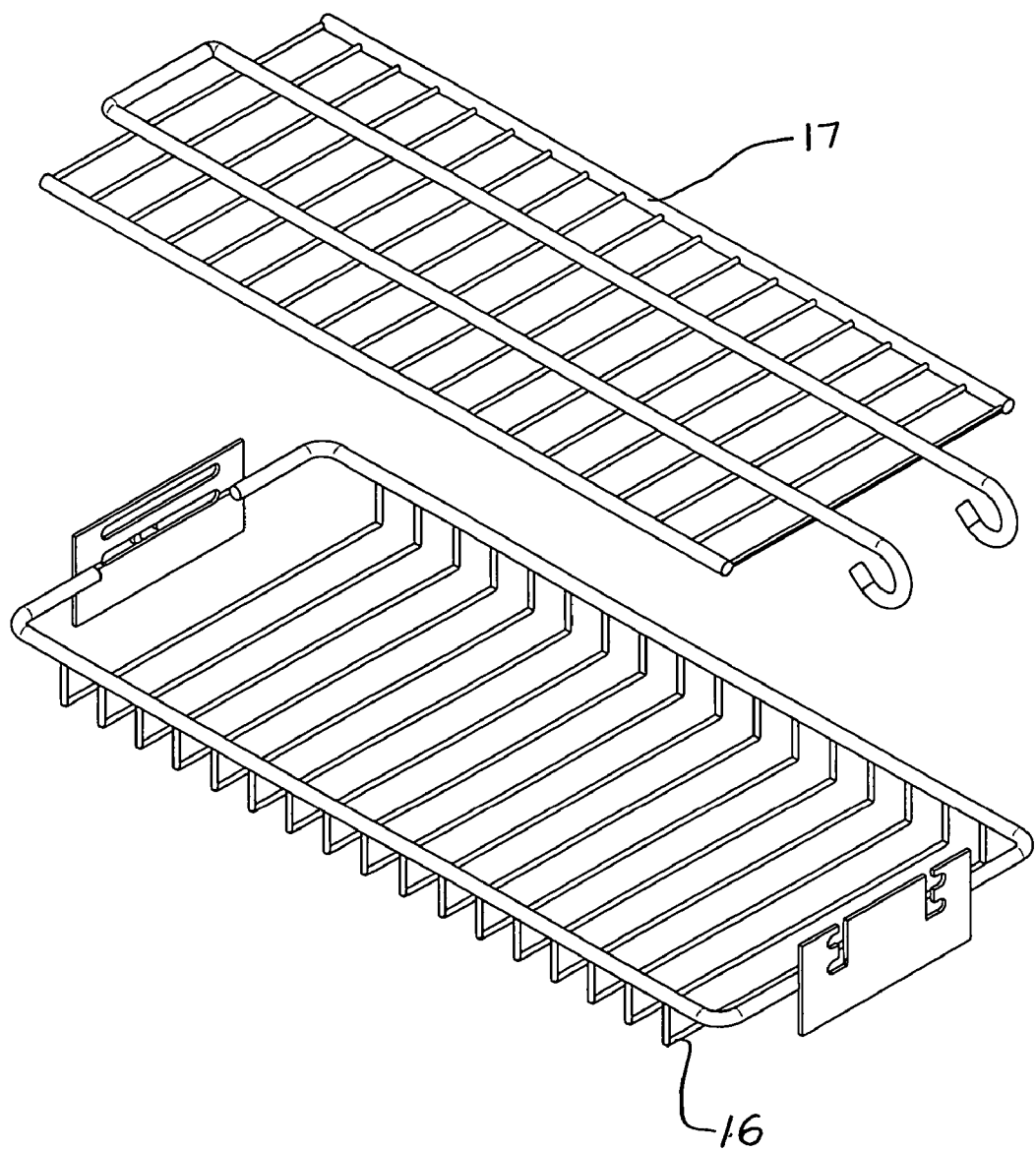
FIG. 7 shows a perspective view of the support rack, with the lower rack and upper rack unassembled.

Referring now to FIG. 7, the lower rack 16 and upper rack 17 are shown unassembled. In use, the user places the food in the lower rack.

Figure 8:
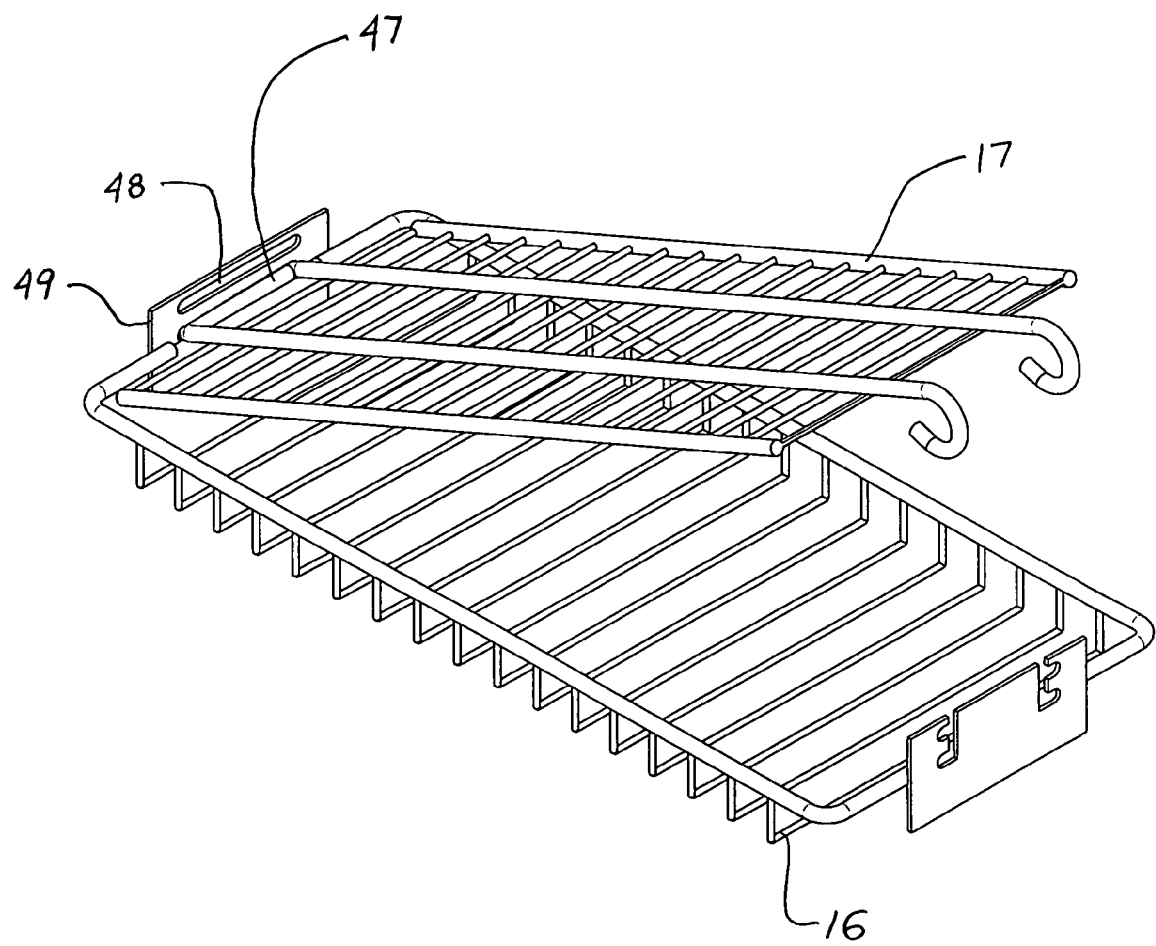
FIG. 8 shows a perspective view of the support rack, with the upper rack partially assembled onto the lower rack.

Referring now to FIG. 8, the user then positions bar portion 47 of upper rack 17 in one of several slots 48 in end bracket 49 of lower rack 16. Multiple slots are provided so that users can cook food of varying thickness.

Figure 9:
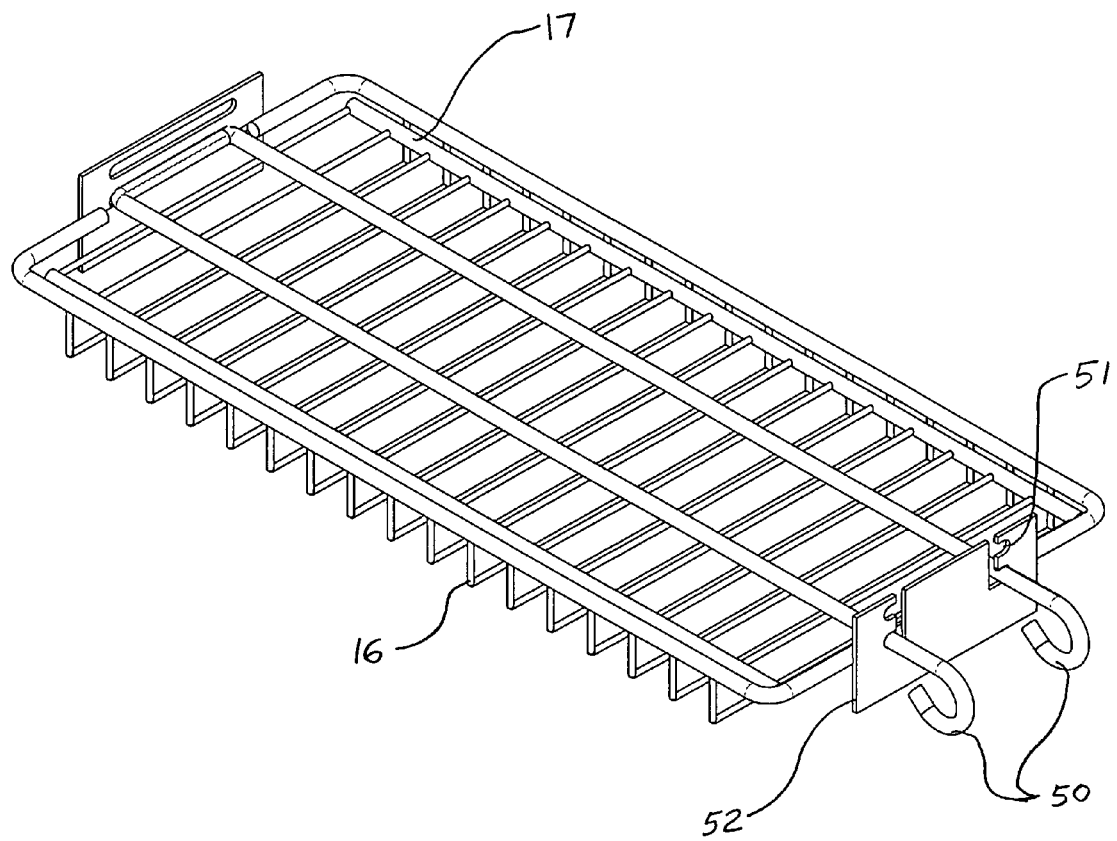
FIG. 9 shows a perspective view of the support rack, with the upper rack assembled to the lower rack.

Referring now to FIG. 9, upper rack 17 has been rotated down until hooks 50 of upper rack 17 engage one of several sets of slots 51 in end bracket 52 of lower rack 16. The user squeezes the two hooks 50 together until the upper rack 17 is positioned at the appropriate slot location for the thickness of the food being cooked, and then releases the hooks to secure the upper rack to the lower rack.

Figure 10:
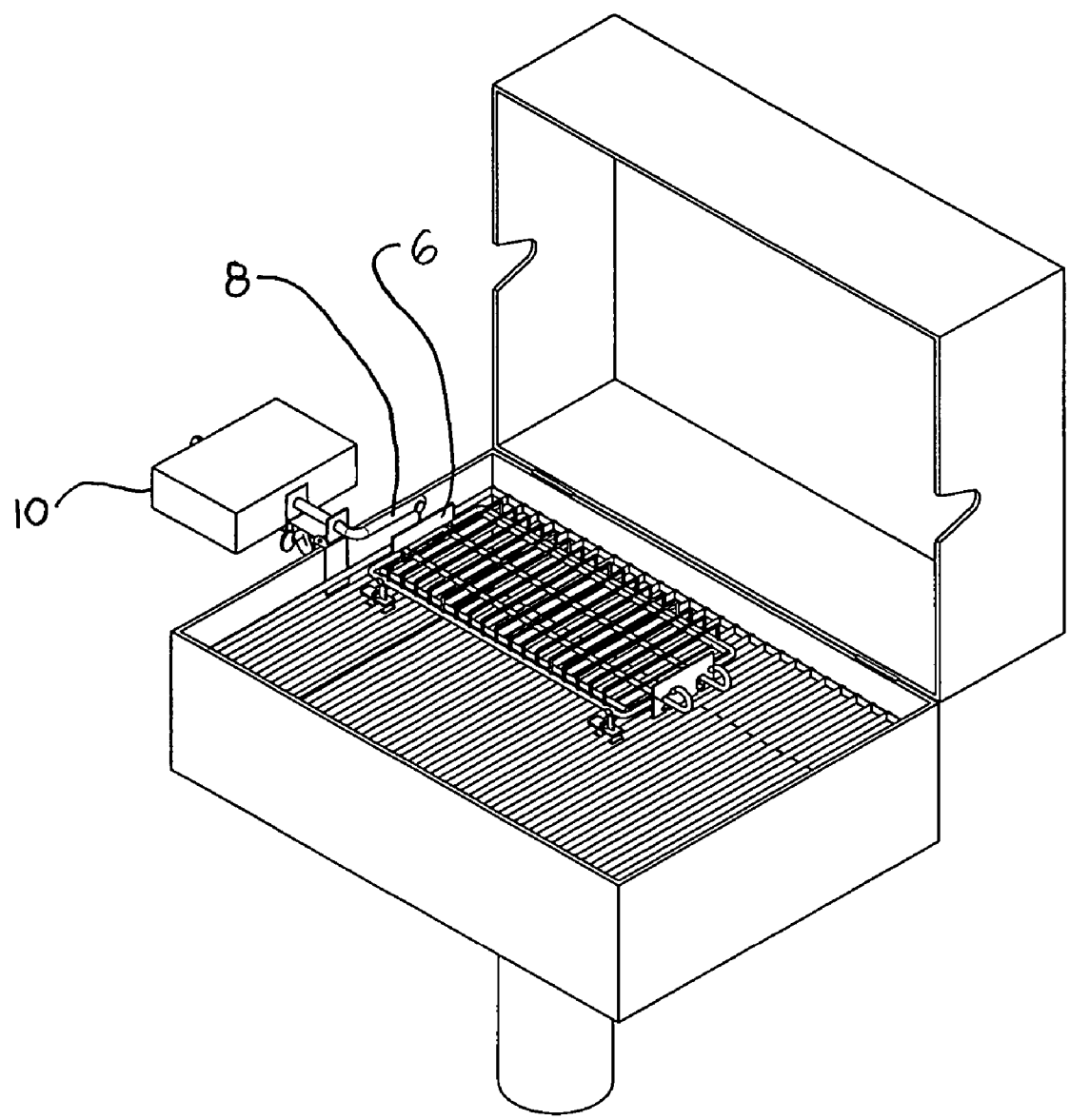
FIG. 10 is a perspective view of an existing grill with the flip-over accessory installed and the support rack in a second position after flipping.

Referring now to FIG. 10, the programmable control has activated the motor, causing drive shaft 8 to flip the support rack 6 180 degrees to the rear position and come to rest. After the programmed interval following the last flip, in the preferred embodiment the programmable control issues a beep tone to alert the user that the food is finished cooking.

Figure 11:
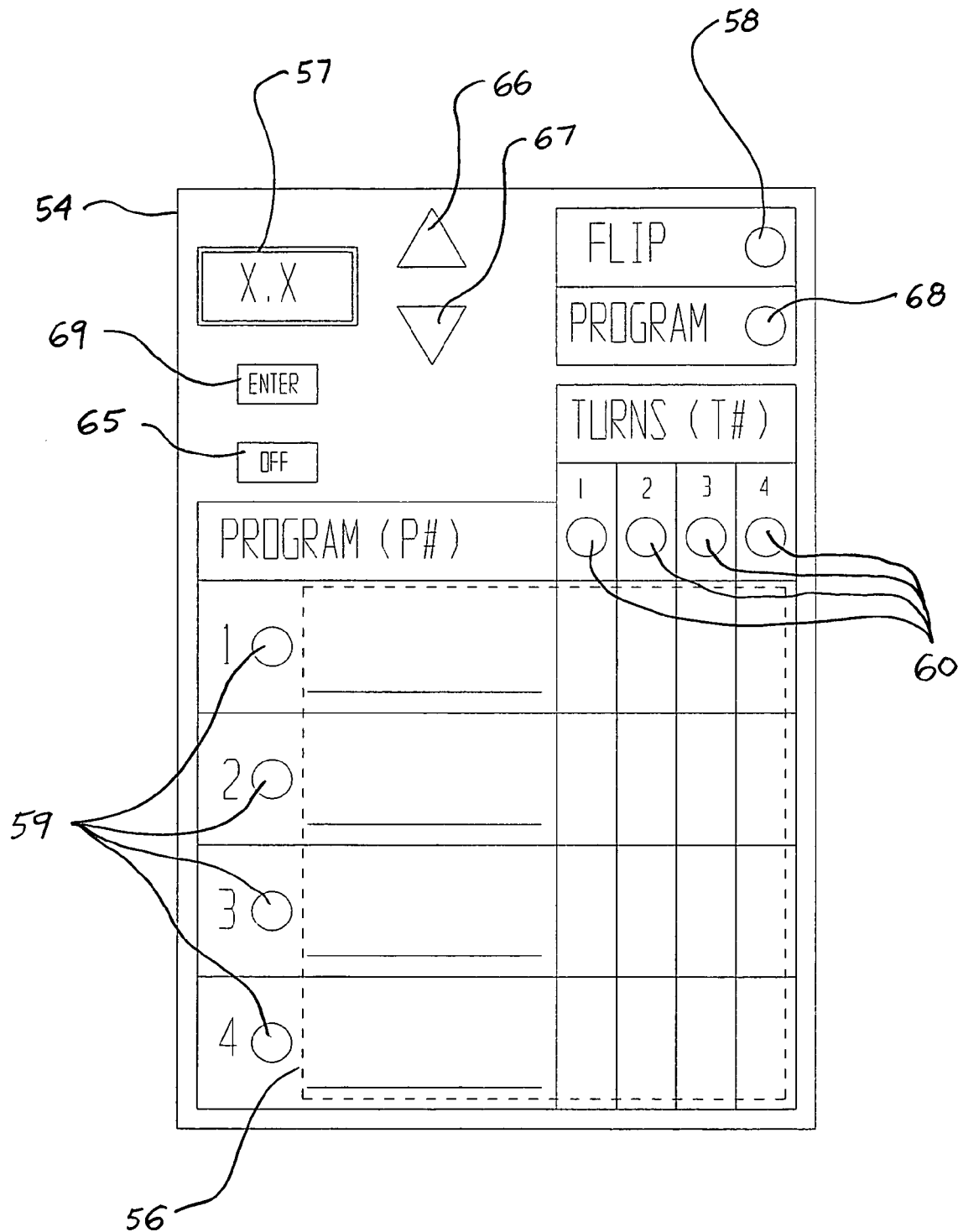
FIG. 11 is a view of the top of the programmable control pad.

Referring now to FIG. 11, the top of the programmable control pad 54 is shown. What is shown is merely one embodiment which demonstrates a method and interface for users to enable them to enter and store individual programs for commonly cooked foods. Writing area 56 is shown, wherein users may enter the particular food item under the "PROGRAM (P#)" column, and the specific intervals between flips and after the last flip under the "TURNS (T#)" columns. In the preferred embodiment, this writing area is erasable in the event that the user wishes to change the input for a particular program. While this embodiment allows a maximum of 4 stored programs and a maximum of 4 parts of a programmed cycle, it is understood that there could be any number of stored programs and parts of a programmed cycle. In the preferred embodiment, the programmable control pad 54 includes a display area 57 of light emitting diode (LED), liquid crystal display (LCD) type, or other display type commonly found in the art. The embodiment shown allows users to input times in one-half minute increments; however it will be recognized that greater or lesser degrees of time control accuracy are possible. To enter a new program, the user presses the "PROGRAM" button 68. The UP and DOWN buttons 66 and 67 are used to input the desired time increment, while the "ENTER" button 69 enters the desired increment into memory. In the preferred embodiment, the timer control includes read again memory (RAM) such that users may enter and save commonly used intervals for favorite foods. In the preferred embodiment, an override button 58 is provided to allow users to temporarily defeat the existing program and immediately have the drive shaft 8 flip the support rack 6 to the alternate position. In addition, input buttons 59 and 60 are provided with an illumination feature which assists the user during programming and normal use. The use of this illumination feature will become apparent from the following examples. In the preferred embodiment, support rack 6 is designed such that the food items may only be accessed with the support rack in the front position (see FIG. 1). In alternate embodiments, the support rack could be designed such that the food could be accessible from either the front or rear positions.

The following examples demonstrate how users may input, store, change and use the programmable control pad 54. Again, these examples are illustrative only, as there are many ways of designing a user interface to input, store, change and use data to control the flip-over accessory.

For example, to enter a new program, Program #1, which will flip the food over once after 3.5 minutes, then issue a beep tone after 2.5 minutes, the user would follow the steps shown in FIG. 12.

To change this program at a later time such that the food will be flipped at the 3 minute mark, the user would follow the steps shown in FIG. 13.

During normal use of the Program #1 programmed per the steps shown in FIG. 12, the user would merely press the P1 button. At that time, the display will show "3.5" to indicate that there will be a 3.5 minute interval to the first flip. At the conclusion of the 3.5 minute interval, the food is flipped, and the display changes to "2.5", to indicate that there will now be another 2.5 minute interval before the beep tone is issued to alert the user the food is done. The P1 button remains illuminated throughout the complete cycle then shuts off at the conclusion of the cycle. The T1 button remains illuminated for the first 3.5 minutes, then it shuts off and the T2 button is illuminated for the next 2.5 minutes, at which time it shuts off. In this instance, because the support rack is in the rear position at the conclusion of the cycle, the user would press the override button 58 to bring the support rack to the front position so the food may be accessed.

The override button 58 may be used in one of two ways: first, if for some reason the user wishes to override a portion of a programmed cycle, for example if they feel the food is cooking too fast on one side and they wish to flip it immediately, then they push the override button and the support rack immediately flips to the alternate position. In this instance, the T# skips to the beginning of the next interval in the programmed cycle. In the instance exemplified in FIG. 12, if the unit was in the middle of the T1 or 3.5 minute cycle and the override button was pressed, then the display would change from "3.5" to "2.5", the T1 button illumination would go out and the T2 button would become illuminated, at which point the unit would complete its normal programmed cycle from that point forward.

In the second instance, the unit may not be turned on, however for some reason the user may wish to turn the food manually so they would use the override button to flip the support rack to the alternate position.

In addition, there may be an instance where the user may wish to shut the unit off completely after a program has been activated. Pressing the Off button 65 accomplishes this.

In an alternate embodiment, the motor control is a simple switch which may either be installed in the motor mount 10 or remote from the motor mount using a control cable.

Figure 14:
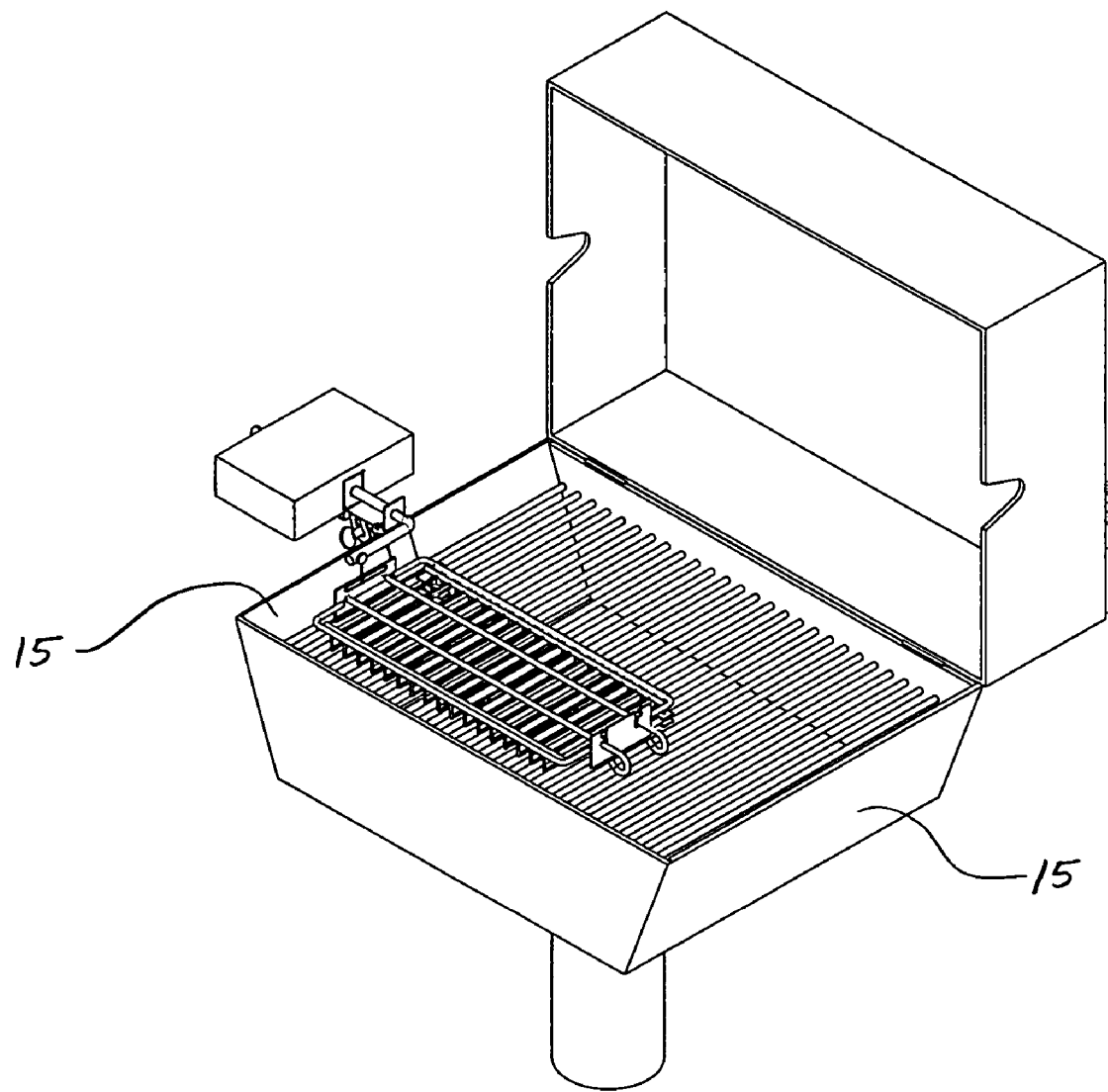
FIG. 14 is a perspective view of another type of existing grill with tapered lateral walls, with the flip-over accessory installed.

Referring to FIG. 14, there is shown a type of grill with tapered short lateral walls 15.

Figure 15:
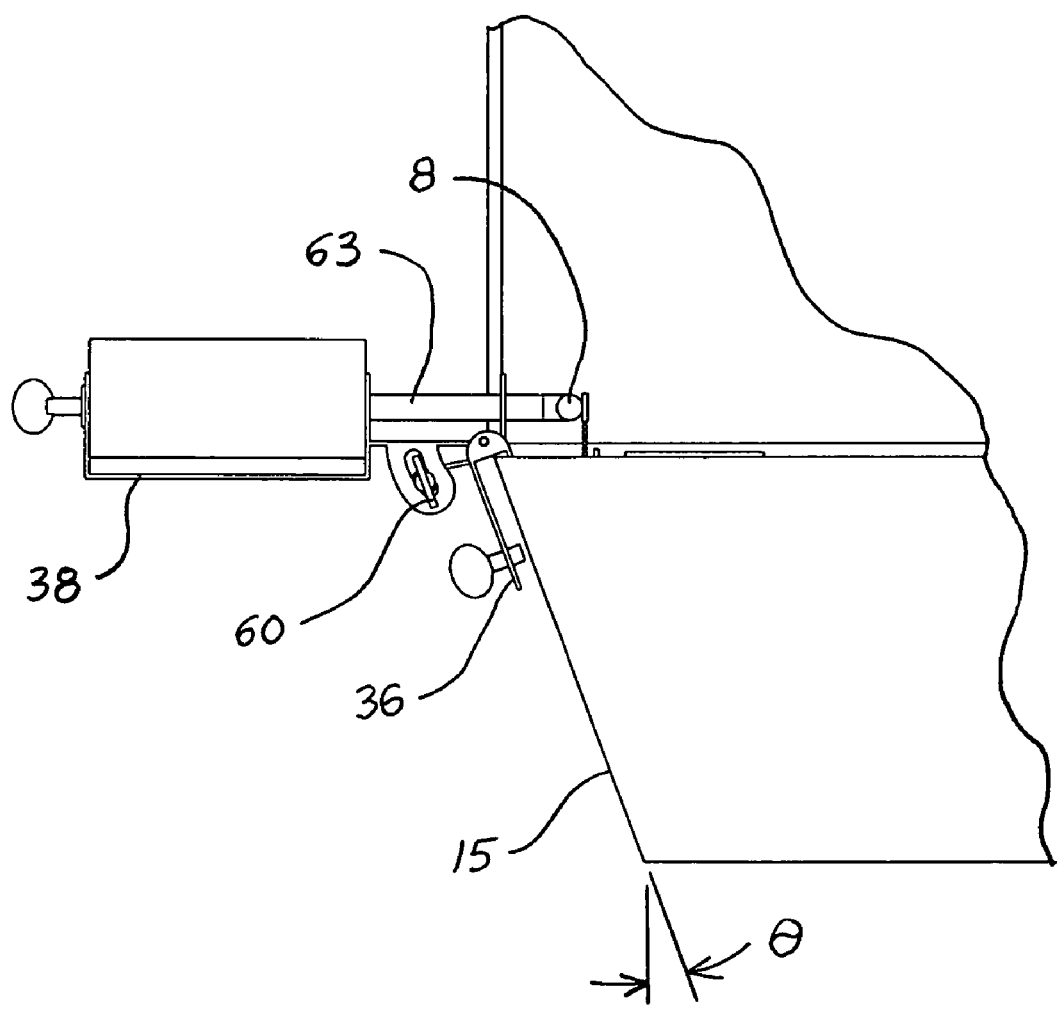
FIG. 15 is a detail view of the front of the grill with tapered lateral walls, with the flip-over accessory installed.

Referring to FIG. 15, it is shown that short lateral wall 15 forms an angle of $\ominus$ from vertical. Motor mount lateral axis thumbscrew 60 of grill bracket 36 has been loosened; motor mount bracket 38 has been rotated about axis 37 (see FIG. 2) such that axis of rotation of section 63 of drive shaft 8 is horizontal, and then motor mount lateral axis thumbscrew 60 is tightened. This adjustment is necessary to insure that the drive shaft 8 is in the proper position to flip the support rack.

Figure 16:
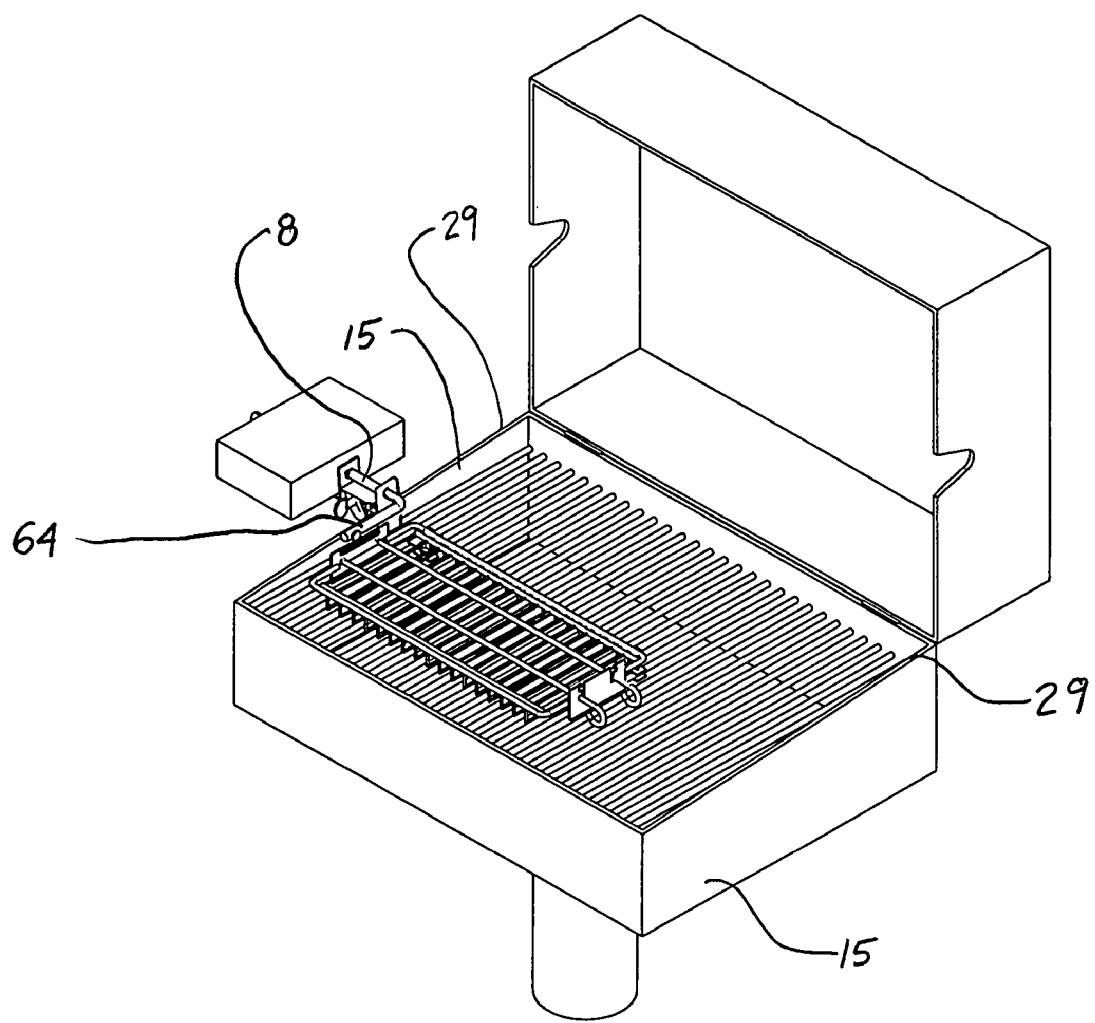
FIG. 16 is a perspective view of another type of existing grill having a slope on the upper edges of the lateral walls, with the flip-over accessory installed.

Referring to FIG. 16, there is shown a type of grill with a slope on the top edge 29 of short lateral walls 15.

Figure 17:
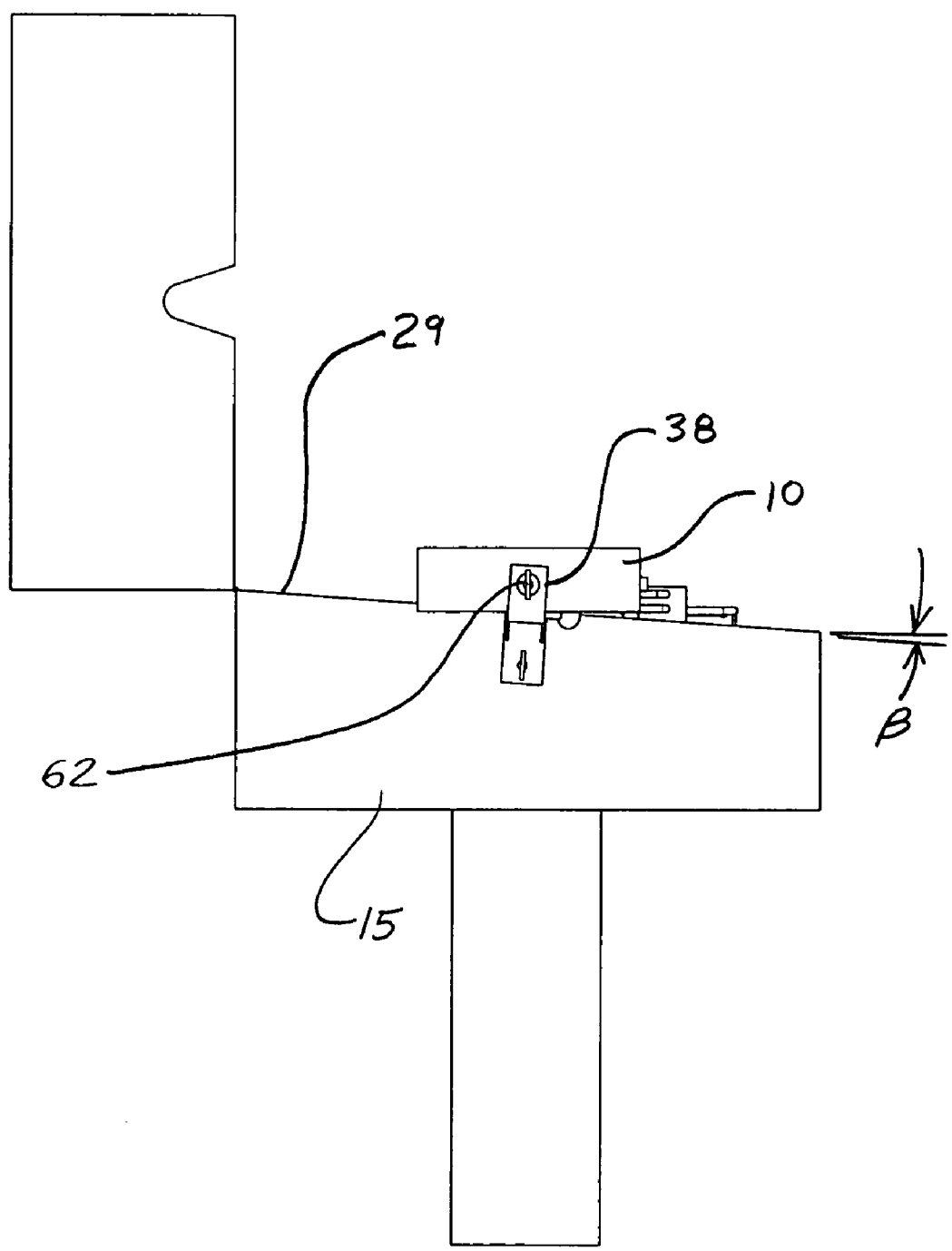
FIG. 17 is a detail view of the left of the grill having a slope on the upper edges of the lateral walls, with the flip-over accessory installed.

Referring to FIG. 17, it is shown that the top edge 29 of short lateral wall 15 forms an angle of β from horizontal. Motor mount lateral axis thumbscrew 62 of motor mount bracket 38 has been loosened; motor mount 10 has been rotated about axis 39 (see FIG. 2) such that section 64 of drive shaft 8 (see FIG. 16) is horizontal, then Motor mount lateral axis Motor mount lateral axis thumbscrew 62 is tightened. This adjustment is necessary to insure that the drive shaft 8 is in the proper position to flip the support rack.

What is claimed is:

1. An accessory for a barbecue grill which automatically flips food over essentially 180 degrees at desired intervals, comprising:
    a support rack comprising a lower rack of open mesh upon which the food to be cooked may be placed, an upper rack of open mesh adapted to be positioned over the food to be cooked located on the lower rack, and a releasable clamp to couple together the lower and upper racks with the food to be cooked therebetween; and
    a rack mount for securing said support rack to a grill so that the support rack rests essentially on the grill and provides for rotational motion of the support rack so that it may be flipped over essentially 180 degrees; and
    a motor mount comprising a motor and an L-shaped drive shaft; and
    a motor control controlling the motor so that the motor may be energized to partially rotate the drive shaft and flip the support rack essentially 180 degrees.

2. The accessory as set forth in claim 1, and further comprising:
    a linkage which connects said drive shaft to the support rack, said linkage being adjustable to allow use on grills of varying dimensions.

3. The accessory as set forth in claim 2, wherein said connection of said linkage to the support rack is a pivoting clip which rotates on a post of the support rack, and wherein said partial rotation occurs on an axis essentially parallel to the longitudinal edges of the support rack.

4. The accessory as set forth in claim 2, wherein said linkage is a metallic bead chain.

5. The apparatus as set forth in claim 1, wherein said motor mount is adjustable to allow the motor mount to be rotated about an axis essentially parallel to the top edge of the grill lateral wall.

6. The accessory as set forth in claim 1, wherein said rack mounts are attached to the grill.

7. The accessory as set forth in claim 1, wherein said rotational motion of the support rack occurs along an axis essentially coincident with one of the longitudinal edges of the support rack.

8. The accessory as set forth in claim 1, wherein the lower and upper racks are coupled together using a series of slots such that foods of varying thickness may be accommodated.

9. The accessory as set forth in claim 1, wherein said motor control is a switch mounted inside the motor mount.

10. The accessory as set forth in claim 1, wherein said motor control is a switch mounted remote from the motor mount and connected to the motor mount by a cable.

* * * * *